United States Patent
Kolhi et al.

(10) Patent No.: US 8,295,285 B2
(45) Date of Patent: Oct. 23, 2012

(54) METHOD AND APPARATUS FOR COMMUNICATION OF DATA PACKETS BETWEEN LOCAL NETWORKS

(75) Inventors: Johan Kolhi, Vaxholm (SE); Christian Gotare, Getinge (SE); Tomas Thyni, Jarfalla (SE); Annikki Welin, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 220 days.

(21) Appl. No.: 12/922,974

(22) PCT Filed: Mar. 20, 2009

(86) PCT No.: PCT/SE2009/050292
§ 371 (c)(1),
(2), (4) Date: Sep. 16, 2010

(87) PCT Pub. No.: WO2009/116945
PCT Pub. Date: Sep. 24, 2009

(65) Prior Publication Data
US 2011/0013641 A1    Jan. 20, 2011

Related U.S. Application Data

(60) Provisional application No. 61/038,192, filed on Mar. 20, 2008.

(51) Int. Cl.
*H04L 12/28* (2006.01)

(52) U.S. Cl. ............... 370/392; 370/401; 709/220
(58) Field of Classification Search .................. None
See application file for complete search history.

(56) References Cited

U.S. PATENT DOCUMENTS

| | | | |
|---|---|---|---|
| 6,888,837 B1 | 5/2005 | Cunningham et al. | |
| 7,099,319 B2 * | 8/2006 | Boden et al. | 370/389 |
| 7,333,510 B1 | 2/2008 | Hies et al. | |
| 2004/0148439 A1 | 7/2004 | Harvey et al. | |
| 2004/0218611 A1 | 11/2004 | Kim | |
| 2005/0257039 A1 * | 11/2005 | Marshall | 713/1 |
| 2007/0097977 A1 | 5/2007 | Boden et al. | |
| 2007/0195800 A1 | 8/2007 | Yang et al. | |

* cited by examiner

*Primary Examiner* — Duc C Ho
(74) *Attorney, Agent, or Firm* — Coats & Bennett, P.L.L.C.

(57) ABSTRACT

Method and arrangement for obtaining unambiguous addressing for data packets communicated between devices in two different local networks using private IP address spaces. A VPN tunnel is initially established between gateways in the two local networks and an internal IP address space is defined in each network for devices in the opposite network, not overlapping with an internal IP address space used for its own devices. When the gateway of one network receives a data packet from a device in the opposite network, the packet's header is modified by changing the destination and source addresses, which belong to address spaces valid in the opposite network, into addresses belonging to address spaces valid in the present network.

27 Claims, 3 Drawing Sheets

METHOD AND APPARATUS FOR COMMUNICATION OF DATA PACKETS BETWEEN LOCAL NETWORKS

TECHNICAL FIELD

The invention relates generally to a method and apparatus for communication of data packets in a VPN (Virtual Private Network) tunnel between communication devices located within different local networks which could use overlapping address spaces.

BACKGROUND

Packet-based transmission of digitally encoded information between different parties over IP (Internet Protocol) networks is used for a variety of communication services, such as e-mail messaging, file transfers, Internet browsing, voice and video telephony, content streaming, games, and so forth. Digitally encoded information is arranged into data packets at a sending party which then transmits the packets towards a targeted receiving party over a transmission path. A data packet is basically configured with a data field containing payload data and a header field containing a destination address of the receiving party and a source address of the sending party.

Data packets may be communicated between various communication devices located within different local or private networks where each network employs a gateway for receiving packets to the devices from sources outside the network, and also for sending packets from the devices to destinations outside the network. The packets communicated between such devices in different local networks are then transported between the respective network gateways over a public IP network, such as the Internet.

In this description, the term "local network" is used to generally represent any network using internal private addressing and a gateway for external communication with parties outside the network. Other commonly used equivalent terms include "private network", "residential network" and "home network". Further, a "gateway" could be a residential gateway (RGW), an IP router or any other type of network entity capable of communicating data packets between a device within a local network and an entity outside the network.

Since communication over public IP networks is generally deemed "unsafe" with respect to data protection and privacy, it is desirable to protect payload data and other sensitive information in the packets from illicit interception or manipulation. One way of overcoming this problem is to establish a VPN (Virtual Private Network) tunnel between the communicating parties over the public IP network.

A VPN can be seen basically as an encrypted tunnel through a public IP network, for transferring data packets between terminals and servers. VPNs are commonly used for secure communications through the public Internet. Various QoS (Quality of Service) parameters may be defined for a VPN to achieve expected behaviour between a VPN customer and a VPN service provider. Generally, a VPN may be established for two or more communication devices in a user community to provide a certain functionality that is in some respect relevant to that community.

As the popularity and usage of the Internet grows, it becomes increasingly desirable to extend private and local networks across the Internet as well. For example, many companies and enterprises having a local network establish their own VPNs to allow their employees to access the local network remotely.

A VPN can thus be seen as a logical and "distributed" local network running over a public network infrastructure. These networks make use of a range of technologies to obtain traffic privacy, traffic separation and QoS of the data. A VPN can be established over an intranet, the Internet or a service provider's network infrastructure. There are generally two basic types of VPN services available referred to as "Access VPNs" and "LAN (Local Area Network)-to-LAN VPNs", the former being used for remote access and the latter when different local networks are interconnected to provide an intranet or extranet.

However, establishing a VPN between devices in local networks may result in various problems. One problem is that devices within local networks typically use IP-addresses from a private address space, where such private IP addresses can be freely assigned to devices internally by a local administrator or the like. The used private IP-addresses are thus basically unknown to other users, unless explicitly told, and also to the Internet service provider providing public IP-addresses to subscribers.

Another problem is that the private IP-addresses used by different local networks for their devices are generally overlapping with each other, in particular the commonly used Ipv4-based private address spaces which are re-used in multiple local networks. For example, the private IP address used by a device in one local network may be the same address as the one used by another device in the opposite local network, resulting in ambiguous addressing in communicated data packets between these two networks. This makes it a cumbersome task to connect different local networks together by means of a VPN tunnel. Due to such overlapping or re-used address spaces, private IP addresses are effectively "unroutable" in the public Internet, and public IP addresses must therefore also be used in the packets.

SUMMARY

It is an object of the invention to address at least some of the problems outlined above. It is also an object to provide a mechanism for enabling unambiguous addressing for data packets even when devices in two different local networks communicate using potentially overlapping address spaces.

According to different aspects, a method, an arrangement in a gateway, a computer program and a computer program product are provided to enable communication of data packets between a first communications device in a first local network and a second communications device in a second local network, wherein potentially overlapping private IP addresses are used for devices in the first and second local networks.

In one aspect, a method is provided where a VPN tunnel is established between a first gateway serving the first local network and a second gateway serving the second local network, wherein a public IP address has been assigned to each gateway. A selected internal IP address space is defined in the first gateway, to be used in the first local network for devices in the second local network. The selected IP address space is separate from, i.e. non-overlapped with, an internal IP address space used in the first local network for devices in the first local network.

The first gateway then receives an incoming data packet from the second device via the VPN tunnel, the incoming packet having an internal IP header including an internal destination address used in the second local network for the first device and an internal source address used in the second local network for the second device. The first gateway then changes the received internal destination address to an internal destination address used in the first local network for the first device, and changes the received internal source address to an internal source address of the selected address space used in the first local network for the second device and being within the selected internal IP address space. The first gateway then forwards the incoming packet to the first device with a modified internal IP header including the changed internal destination and source addresses.

In another aspect, an arrangement is provided in a first gateway which serves a first local network and is capable of communicating data packets between a first communications device in the first local network and a second communications device in a second local network served by a second gateway. The first gateway is adapted to establish a VPN tunnel between the first gateway and the second gateway, where a public IP address has been assigned to each gateway and potentially overlapping private IP addresses are used for devices in each local network.

The gateway arrangement comprises IP address defining means adapted to define a selected internal IP address space to be used in the first local network for devices in the second local network, the selected IP address space being separate from, i.e. non-overlapped with, an internal IP address space used in the first local network for devices in the first local network.

The gateway arrangement also comprises receiving means adapted to receive an incoming data packet from the second device via the VPN tunnel, the incoming packet having an internal IP header including an internal destination address used in the second local network for the first device and an internal source address used in the second local network for the second device.

The gateway arrangement also comprises IP address changing means adapted to change the internal destination address to an internal destination address used in the first local network for the first device, and to change the internal source address to an internal source address of the selected address space used in the first local network for the second device and being within the selected internal IP address space.

The gateway arrangement also comprises forwarding means adapted to forward the incoming packet to the second device with a modified internal IP header including the changed internal destination and source addresses.

In yet another aspect, a computer program is configured for a first gateway that serves a first local network and is capable of communicating data packets between a first communications device in the first local network and a second communications device in a second local network served by a second gateway. Further, a VPN tunnel is established between the first gateway and the second gateway, a public IP address has been assigned to each gateway, and potentially overlapping private IP addresses are used for devices in each local network.

The computer program comprises code means which when run on the first gateway causes the first gateway to define a selected internal IP address space to be used in the first local network for devices in the second local network, the selected IP address space being separate from, i.e. non-overlapped with, an internal IP address space used in the first local network for devices in the first local network.

When receiving from the second device via the VPN tunnel an incoming packet having an internal IP header including an internal destination address used in the second local network for the first device and an internal source address used in the second local network for the second device, the code means causes the first gateway to change the internal destination address to an internal destination address used in the first local network for the first device, and to change the internal source address to an internal source address of the selected address space used in the first local network for the second device and being within the selected internal IP address space. The incoming packet is then forwarded to the first device with a modified internal IP header including the changed internal destination and source addresses.

In yet another aspect, a computer program product comprises the computer program above and a computer readable medium on which the computer program is stored.

Each of the above method, gateway arrangement, computer program and computer program product may further comprise features and functions configured according to the following embodiments.

When the incoming packet also has an external IP header including the public IP addresses of the first and second gateways as external destination and source addresses, respectively, the external IP header is removed from the incoming packet by the first gateway.

In another embodiment, the first gateway further receives an outgoing data packet from the first device, the outgoing packet having an internal IP header including an internal destination address used in the first local network for the second device and an internal source address used in the first local network for the first device. The packet is then encapsulated with an external IP header including the public IP addresses of the gateways as external destination and source addresses, respectively. The correct VPN tunnel can be determined for the outgoing packet based on the internal destination address, and the outgoing packet is then sent to the second gateway via the VPN tunnel.

In further embodiments, VPN tunnels are established between the first local network and a plurality of opposite local networks. A selected internal IP address space is then defined for each opposite network to be used in the first local network for devices in each respective opposite network, each selected IP address space being separate from, i.e. non-overlapped with, any other address space used in the first local network. The selected IP address spaces may include IPv4-based addresses, and a unique number in a second or third octet of each IP address may then be allocated to represent the corresponding opposite local network. A VPN tunnel can then be determined for each outgoing packet based on the unique number in an internal destination address in the outgoing packet, and the packet is then sent via the determined VPN tunnel. Establishing the VPN tunnels may include adding in the gateway of each local network a DNS-registered name and corresponding public PKI key of each opposite gateway. The public PKI key and a corresponding private PKI key can also be generated for each gateway and the public PKI keys are stored in a PKI server accessible for the gateways.

In further embodiments, a trust list with trusted parties has been created for the first local network, and a VPN tunnel is admitted for establishment between the first local network and a candidate local network if the candidate local network is associated with a first party present in the trust list. The VPN tunnel may further be admitted for establishment if the candidate local network is indirectly associated with the first party in the trust list by being associated with a second party present in a trust list of the first party. For example, the VPN tunnel may be admitted for establishment depending on a predetermined number of trust levels approved for the first local network.

The candidate local network could be evaluated for establishment of VPN tunnel in response to a VPN tunnel request from the candidate local network. An established VPN tunnel between two local networks could also be terminated automatically if a trust list associated with either network is modified to disqualify the VPN tunnel.

Further possible features and benefits of the invention will become apparent from the detailed description below.

BRIEF DESCRIPTION OF THE DRAWINGS

The invention will now be described in more detail by means of exemplary embodiments and with reference to the accompanying drawings, in which.

DETAILED DESCRIPTION

The invention provides a mechanism for obtaining unambiguous addressing for data packets even when devices in two different local networks communicate using overlapping address spaces. Briefly described, a VPN tunnel is initially established between gateways in the two local networks where a public IP address has been assigned to each gateway. In addition, a selected internal IP address space is defined in each local network to be used in the present network for devices in the opposite local network, and which is separate from, i.e. does not overlap with, an internal IP address space used in the present local network for its own devices.

When any incoming data packet from a device in an opposite network is received at the gateway of a present local network, the header of that packet has an internal IP header with private IP destination and source addresses potentially overlapping with the address space used in the present network for its own devices. The header is then modified at the receiving gateway by changing the destination and source addresses into addresses belonging to the above address spaces used in the present network for the two devices, respectively. In particular, the source address of the sending device is taken from the internal IP address space defined above for devices in the opposite network. Thereby, the source address in the internal IP header of the incoming packet cannot be confused with the private IP addresses of any devices in the present network.

An example of how the above can be accomplished will now be described with reference to a communication scenario shown in FIG. 1. Thus, it is assumed that users of two different local networks A and B have agreed to set up a VPN tunnel between the networks to enable "safe" communication of data packets over a public IP network 100, in this example the Internet, between devices in the opposite networks, e.g. due to the reasons presented above.

Figure 1:
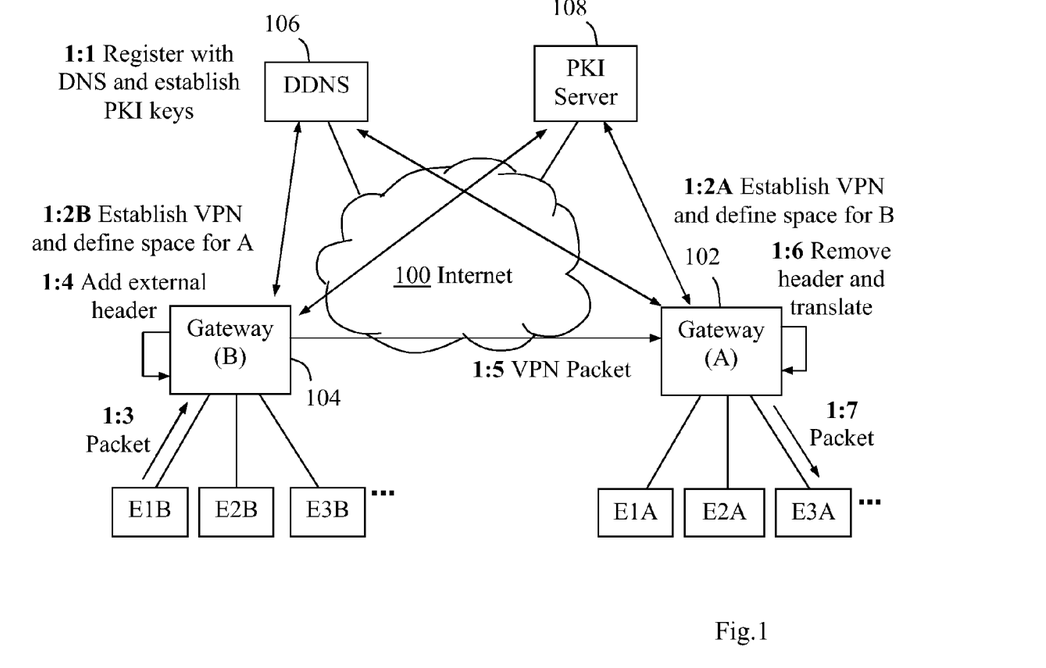
FIG. 1 is a schematic block diagram illustrating a communication scenario involving a VPN tunnel, according to some exemplary embodiments.

In FIG. 1, a first gateway 102 and a second gateway 104 are shown serving the first and second networks A and B, respectively, where a plurality of devices E1A, E2A, E3A . . . are present in the first network and plurality of devices E1B, E2B, E3B . . . are present in the second network. A private address space is used in each local network for internal communication, the address spaces potentially overlapping with each other since such address spaces are widely re-used in numerous local networks, generally. It is further assumed that each gateway 102, 104 comprises a function for translating private network addresses in a manner to be described below, which may be referred to as a "NAT" (Network Address Translation) function.

Before establishing the VPN tunnel, each gateway 102, 104 will first register their names and public IP addresses with a DNS (Domain Name Server), in this case a DDNS 106 (Dynamic DNS) allowing for both dynamic and static IP addresses, which is typically done when activating the gateway. The gateways 102, 104 also generate their public and private keys or certificates for encryption according to the well-known PKI (Public Key Infrastructure) mechanism, and the public keys are registered in a PKI server 108. A first step 1:1 illustrates schematically the DNS registration and key establishment made by both gateways, as shown by the two-way arrows in the figure. This step can thus be executed according to regular procedures which are not necessary to describe here further to explain this example.

The following steps 1:2A and 1:2B illustrate that the VPN tunnel is established between the gateways, and also that each gateway defines an IP address space for devices in the opposite local network, which has been selected as to avoid overlap with the IP address space used internally for its own devices. Thus, gateway 102 defines an IP address space for devices of network B in step 1:2A, while gateway 104 defines an IP address space for devices of network A in step 1:2B. Establishing the VPN includes, among other things, storing in each gateway the above defined IP address space, or at least an identification thereof, as well as the name and associated public IP address of the opposite gateway, which are available and retrieved from the DDNS 106.

In this way, a gateway in a local network can establish multiple VPN tunnels with gateways of other local networks, and a translation table or the like can be created in the gateway, containing at least a tunnel identity and a non-overlapping IP address space used in the network for each opposite local network. None of these IP address spaces should thus not overlap with any other IP address space used in that network. Whenever an incoming data packet is received from a device in any of the opposite local networks, the incoming VPN tunnel is identified and a local IP address, taken from the IP address space associated with that tunnel in the table, is used in the receiving network for the device of the sending network, which will be described in more detail below.

As mentioned above, the translation table may contain an identification of the defined IP address space associated with each tunnel identity. For example, if the IP address spaces include IPv4 (IP fourth version) based addresses, a unique number in a second or third octet of each IP address can be allocated to represent the corresponding opposite local network. That unique number may then be sufficient for identifying the network in the table. For example, if the address space of 10.0.0.0/24 is used for devices within the present network, the following exemplary IP address spaces may be defined for different opposite networks: 10.0.1.0/24, 10.0.2.0/24, 10.0.3.0/24 . . . , using the third octet as a network identification. However, other addressing schemes and suitable network identifications may also be used in a similar way and the invention is not limited to the above example.

Thereby, the correct VPN tunnel can also be determined for an outgoing packet based on the unique number in the internal destination address of that packet, such that the packet can then be sent via the determined VPN tunnel. It is assumed that the sending device can obtain knowledge of the IP address space that was defined for devices in the opposite local network and that the destination address in the packet is the one assigned to the receiving device.

Returning to FIG. 1, a data packet is sent from one device E1B in local network B, directed to another device E3A in local network A. The packet has an internal header with local destination and source IP addresses, and is firstly received at the gateway 104 in a following step 1:3. In the internal header, the destination and source IP addresses of E3A and E1B, respectively, are addresses used in the sending network B, but not in the receiving network A. Therefore, a translation of these addresses is necessary for obtaining unambiguous addressing in the receiving network A, which will be made by the gateway 102 of the receiving network A. This will thus ensure that the packet reaches the intended destination device.

Before sending out the packet, gateway 104 identifies the VPN tunnel with network A based on the private destination IP address in the internal header, e.g. from the second or third octet in the manner described above, although other identification schemes are also possible, and adds an external header with the public IP addresses of gateways 102 and 104 as destination and source IP addresses, respectively, in a next step 1:4. The packet is then transmitted over the public IP network 100 to gateway 102 of network A, in a next step 1:5. The public destination IP address in the external header can then be used for routing the packet towards gateway 102 through the public IP network 100 in a conventional manner.

When receiving the data packet, gateway 102 removes the external header, having fulfilled its purpose, while the sending network can be deduced from the VPN tunnel used for transmitting the packet. It should be remembered that the received packet contains private destination and source addresses which were valid in the sending network B, but not in the receiving network A. Gateway 102 therefore changes the destination and source addresses in the internal header of the packet, in a further step 1:6, by translating them into addresses used in the receiving network A.

In more detail, the destination address is changed to a destination address used in network A for device E3A, and the source address is changed to an internal source address of the selected address space used in network A for device E1B, the latter address being taken from the internal IP address space previously defined in step 1:2A by gateway 102 for devices in network B. The latter address has been assigned to device E1B, along with the address assignments of other devices, during establishment of the VPN tunnel and this information has been stored at each gateway 102, 104 to enable the address translation for incoming packets. The address assignments may be done according to a predetermined scheme, e.g. by means of a counter assigning "1" in the third octet to a first opposite local network, "2" in the third octet to a second opposite local network, and so forth. The address assignments may further be static or dynamic.

Figure 2:
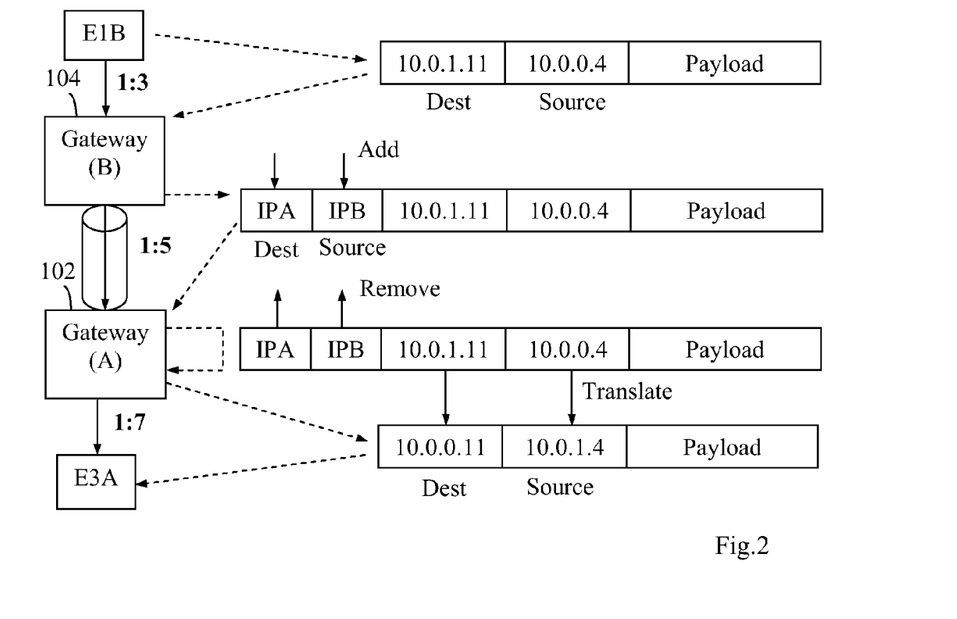
FIG. 2 is a schematic transmission scheme illustrating how the header of a data packet is modified in opposite gateways, according to further embodiments.

FIG. 2 illustrates an example of how the header of the data packet discussed above can be configured in more detail at different stages of the packet transmission described for FIG. 1. The left side of FIG. 2 thus depicts the sending device E1B, the gateways 104 and 102 of networks B and A, respectively, and the receiving device E3A.

In this example, network B uses the address space 10.0.0.0/24 for its own devices and the address space 10.0.1.0/24 has been defined for devices of the opposite network A. The third octet in these address spaces thus indicates the device's network, i.e. in network B "0" indicates network B and "1" indicates network A. On the opposite side, network A also uses the address space 10.0.0.0/24 for its own devices and the address space 10.0.1.0/24 has likewise been defined for devices of the opposite network B. Thus in network A "0" indicates network A and "1" indicates network B, contrary to the situation in network B.

When the packet sent from device E1B is firstly received at gateway 104 in accordance with step 1:3 above, it has an internal header valid in network B with a destination address 10.0.1.11 which is valid for device E3A, and a source address 10.0.0.4 which is valid for device E1B. In accordance with step 1:4 above, gateway 104 adds an external header with a public destination address IPA of gateway 102 and a public source address IPB of gateway 104. Gateway 104 then identifies the correct VPN tunnel from the network indication of "1" pointing to network A, and sends the packet via the tunnel to gateway 102, in accordance with step 1:5 above.

Having received the packet, gateway 102 then removes the external header and changes the internal header by translating the private destination address to 10.0.0.11 and the source address to 10.0.1.4, which are valid in network A for devices E1B and E3A, respectively. The packet with the modified internal header is then finally forwarded to device E3A, in accordance with step 1:7 above. Hence, even if overlapping address spaces are used in the networks A and B as described above, the destination and source addresses in the internal header will identify the respective devices properly and without risk for confusion in the receiving network A.

Moreover, device E3A can send a data packet as a reply to device E1B using the received source address as destination address and its own private address as source address, which are both valid in network A. In that case, the above procedure will be repeated in the reverse direction and the receiving gateway 104 will thus change the internal header by translating the destination and source addresses back to the ones valid in network B, i.e. 10.0.0.4 (source) and 10.0.1.11 (destination).

A procedure for communicating data packets between a first communications device in a first local network and a second communications device in an opposite second local network, as executed by a gateway of the first local network, will now be described with reference to the flow chart in FIG. 3. It is assumed that the private IP addresses used in the first and second local networks for their own respective devices are potentially overlapping with each other, e.g. by belonging to an address space that is typically re-used in plural local networks.

In a first step 300, a VPN tunnel is established with a gateway in the opposite second local network which includes, among other things, storing a name and associated public IP address of the opposite gateway, which is available and can be retrieved from a DDNS. In a next step 302, a private IP address space is defined for the second network which has been selected as to be non-overlapping with the private IP address space used in the first network for its own devices. It is further assumed that the opposite second gateway likewise defines a non-overlapping private IP address space for the first network as well. Steps 300 and 302 can be executed basically as described above for steps 1:2A and 1:2B.

At some point later in a further step 304, an incoming data packet is received via the VPN tunnel, which packet has been sent from the second device and having an internal header with destination and source addresses used in the second network for the first and second devices, respectively. The first gateway then changes the destination and source addresses in the internal header, in a next step 306, to destination and source addresses used in first network for the first and second devices, respectively. In a last shown step 308, the packet is forwarded with the modified internal header to the first device. The first device is then able to respond by sending a data packet to the second device using the received source address as destination address which will be translated once again by the receiving first gateway, in the manner described above.

An arrangement in a first gateway 400 will now be described in more detail with reference to the block diagram in FIG. 4. It is assumed that the gateway 400 is serving a first local network, and is capable of communicating data packets between a first communications device in the first local network and a second communications device in a second local network served by a second gateway. It is also assumed that a VPN tunnel has been established between the first gateway and the second gateway, a public IP address has been assigned to each gateway, and that potentially overlapping private IP addresses are used for devices in each local network.

The gateway 400 comprises IP address defining means 400a adapted to define a selected internal IP address space to be used in the first local network for devices in the second local network. The selected IP address space is separate from, i.e. non-overlapped with, an internal IP address space used in the first local network for devices in the first local network.

The gateway 400 further comprises receiving means 400b adapted to receive an incoming data packet P from the second device. The incoming packet P has external and internal IP headers, the latter including an internal destination address used in the second local network for the first device and an internal source address used in the second local network for the second device.

The gateway 400 also comprises IP address changing means 400c adapted to change the internal destination address to an internal destination address used in the first local network for the first device, and to change the internal source address to an internal source address of the selected address space used in the first local network for the second device and being within the selected internal IP address space. The IP address changing means 400c is also adapted to remove the external IP header from the received packet.

The gateway 400 also comprises forwarding means 400d adapted to forward the incoming packet P' to the second device with a modified internal IP header including the changed internal destination and source addresses. Thereby, the addresses in the packet header are separate from and cannot be confused with any addresses of other devices valid in the second local network.

Figure 3:
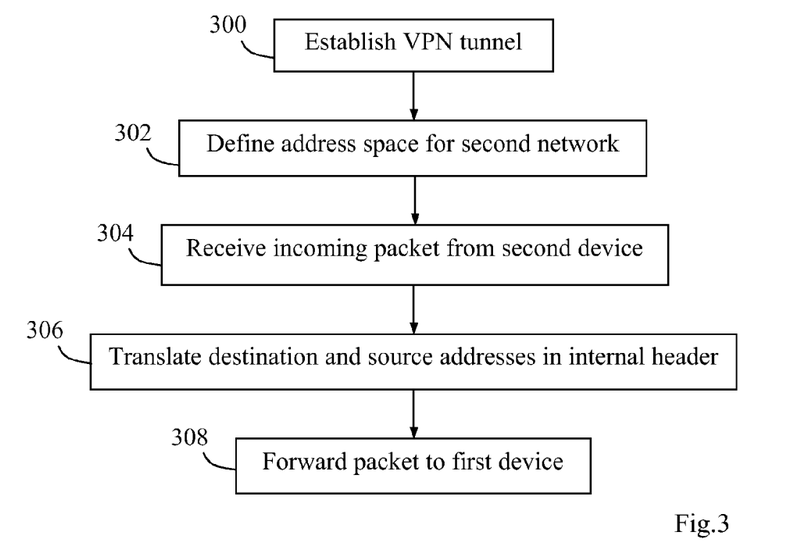
FIG. 3 is a flow chart with steps in a procedure performed by a gateway in a local network for handling an incoming data packet, according to yet an embodiment.

So far, it has been described basically what is made at the receiving side of a data packet transmission, e.g. procedures and functions in the gateway 102 at network A in FIG. 1 and by means of the flow chart in FIG. 3. It will now also be described with reference to the flow chart in FIG. 5 what is performed by the gateway at the sending side of the data packet transmission, e.g., procedures and functions in the gateway 104 at network B in FIG. 1. Using the same situation as for FIG. 3, the following further procedure may be executed by the first gateway when receiving an outgoing data packet from the first device directed to the second device in the opposite second network.

Figure 5:
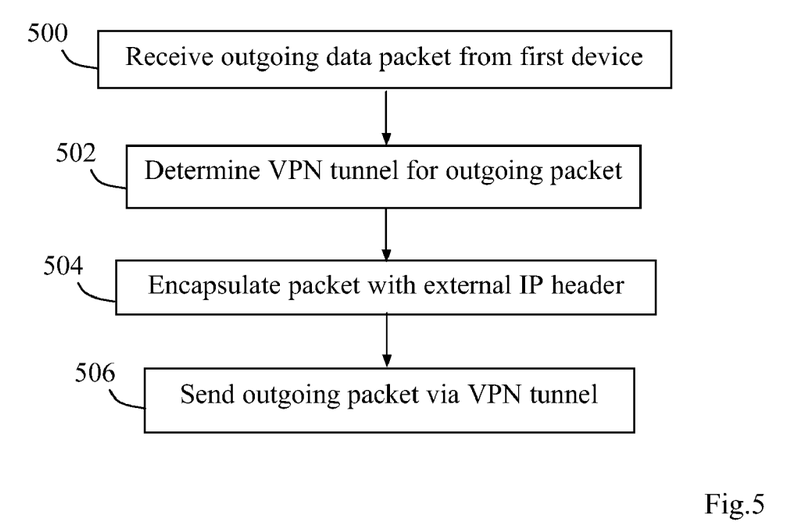
FIG. 5 is another flow chart with steps in a procedure performed by the gateway for handling an outgoing data packet, according to yet an embodiment.

A first step 500 thus illustrates that an outgoing data packet coming from the first device, is received. The outgoing packet has an internal IP header including an internal destination address used in the first local network for the second device and an internal source address used in the first local network for the first device. In a further step 502, the correct VPN tunnel is determined for the outgoing packet based on the internal destination address. For example, if the IP address spaces used include IPv4-based addresses, a unique number in a second or third octet of each IP address can be allocated to represent the corresponding opposite local network, and the correct VPN tunnel is then determined from that number.

In a next step 504, the packet is encapsulated with an external IP header including the public IP addresses of the first and second gateways as external destination and source addresses, respectively, allowing for routing over the public IP network. In a last step 506, the outgoing packet is sent to the second gateway over the public IP network via the determined VPN tunnel.

It is possible to establish VPN tunnels between the first local network and a plurality of opposite local networks. In that case, a selected internal IP address space is defined for each opposite network to be used in the first local network for devices in each respective opposite network. Each selected IP address space should then be separate from, i.e. non-overlapped with, any other address space used in the first local network.

A unique number in a second or third octet of each IP address can further be allocated to represent each corresponding opposite local network. In that case, a correct VPN tunnel can be determined for each outgoing packet based on that unique number in an internal destination address in the outgoing packet, and the packet will then be sent via the determined VPN tunnel. Further, establishing the VPN tunnels includes adding in the gateway of each local network a DNS-registered name and corresponding public PKI key of each opposite gateway.

Figure 4:
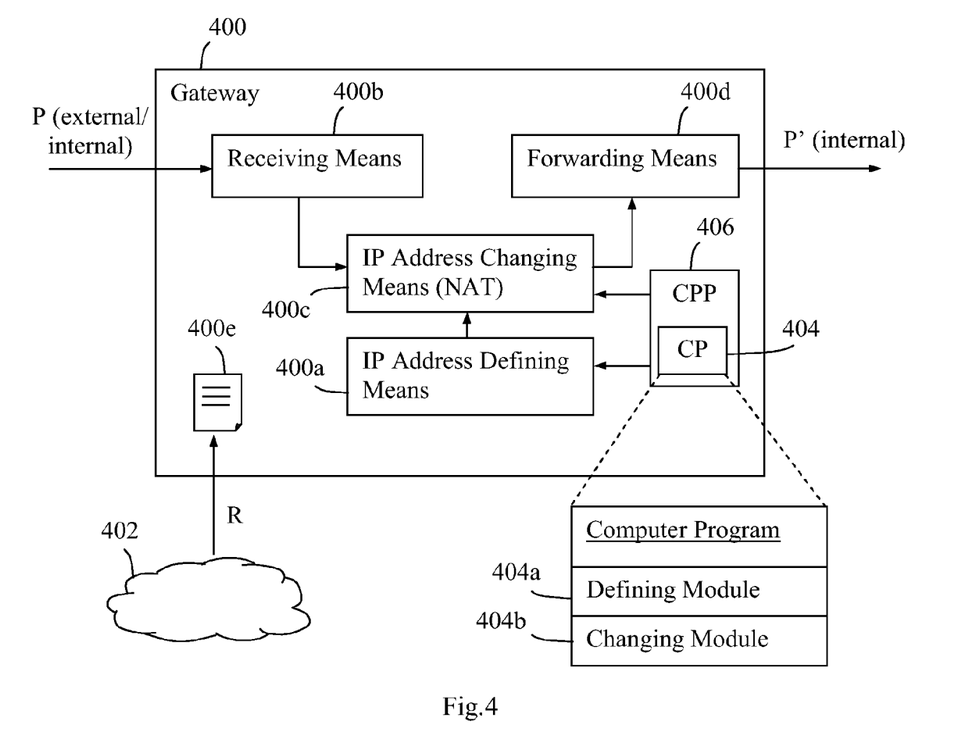
FIG. 4 is a schematic block diagram illustrating a gateway in more detail, according to further embodiments.

According to further possible embodiments illustrated in FIG. 4, a trust list 400e with trusted parties can be created for the first local network in the first gateway 400. When a request or the like is received for establishing VPN tunnel with a gateway of a candidate network 402, the VPN tunnel can be admitted for establishment if the candidate local network is associated with a first party present in the trust list 400e. Furthermore, the gateway 400 may be configured such that the VPN tunnel can also be admitted for establishment if the candidate local network 402 is indirectly associated with the first party in the trust list by being associated with a second party present in a trust list of the first party. The gateway 400 may be further configured such that the VPN tunnel can be admitted for establishment depending on a predetermined number of trust levels approved for the first local network.

As mentioned above, the candidate local network 402 may be evaluated for establishment of a VPN tunnel, based on the trust list 400e, in response to a VPN tunnel request R from the candidate local network. The gateway 400 may be further configured such that an established VPN tunnel between two local networks is terminated automatically if a trust list associated with either network is modified to disqualify the VPN tunnel.

Figure 6:
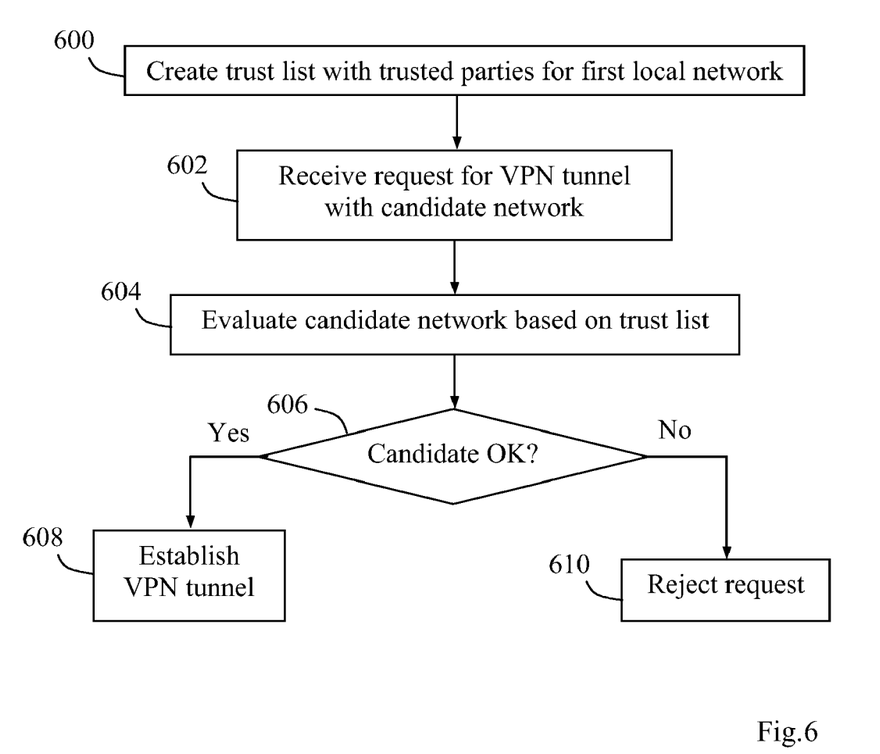
FIG. 6 is another flow chart with steps in a procedure performed by the gateway for handling a VPN request, according to yet an embodiment.

An exemplary procedure for using a trust list in the above manner at a first gateway for VPN tunnel requests, will now be briefly described with reference to the flow chart in FIG. 6. Firstly, a trust list with trusted parties is created for the first local network, as schematically illustrated by a first step 600. When a request for establishing VPN tunnel with gateway in candidate network is received at some point according to a next step 602, the candidate network is evaluated based on the created trust list in a following step 604.

It is then determined if the requested VPN tunnel can be admitted in a step 606, which can be deduced from the trust list as described above, e.g. considering multiple levels of trust lists of already trusted parties. If so, the VPN tunnel is established, as shown by a final step 608, and data packets can be communicated according to the above description. If the trust list does not allow for the VPN tunnel, the request is rejected or simply ignored, in a step 610.

As further illustrated in FIG. 4, the functional units in the gateway 400 described above can be implemented as program modules of a computer program 404 comprising code means which when run on the first gateway 400 causes the first gateway to perform the above-described functions and steps of the first gateway. In this embodiment, the computer program 404 is carried by a computer program product 406 comprising a computer readable medium on which the computer program is stored.

The program modules of the computer program 404 include at least an address space defining module 404a and an address changing module 404b. The address space defining module 404a is capable of defining a selected internal IP address space to be used in the first local network for devices in the second local network, the selected IP address space being separate from, i.e. non-overlapped with, an internal IP address space used in the first local network for devices in the first local network.

The address changing module 404b is capable of, when receiving from the second device via the VPN tunnel an incoming packet having an internal IP header including an internal destination address used in the second local network for the first device and an internal source address used in the second local network for the second device, changing the internal destination address to an internal destination address used in the first local network for the first device, and changing the internal source address to an internal source address of the selected address space used in the first local network for the second device and being within the selected internal IP address space. The incoming packet can then be forwarded to the first device with a modified internal IP header including the changed internal destination and source addresses.

The code means of the computer program 404 and computer program product 406 may also cause the first gateway to perform the following functions.

When the incoming packet has an external IP header including the public IP addresses of the first and second gateways as external destination and source addresses, respectively, the code means may cause the first gateway to remove the external IP header from the incoming packet.

When an outgoing data packet is received from the first device, the outgoing packet having an internal IP header including an internal destination address used in the first local network for the second device and an internal source address used in the first local network for the first device, the code means may also cause the first gateway to:
  encapsulate the packet with an external IP header including the public IP addresses of the gateways as external destination and source addresses, respectively, and
  determine the correct VPN tunnel for the outgoing packet based on the internal destination address,
  before the outgoing packet is sent to the second gateway via the VPN tunnel.

The code means may also cause the first gateway to establish VPN tunnels between the first local network and a plurality of opposite local networks, and to define a selected internal IP address space for each opposite network to be used in the first local network for devices in each respective opposite network, each selected IP address space being separate from, i.e. non-overlapped with, any other address space used in the first local network.

The selected IP address spaces may include IPv4-based addresses, and a unique number in a second or third octet of each IP address may then be allocated to represent the corresponding opposite local network. In that case, the code means may also cause the first gateway to determine a VPN tunnel for each outgoing packet based on the unique number in an internal destination address in the outgoing packet, wherein the packet is then sent via the determined VPN tunnel.

The code means may also cause the first gateway to establish the VPN tunnels by adding a DNS-registered name and corresponding public PKI key of each opposite gateway. The public PKI key and a corresponding private PKI key may have been generated for each gateway and the public PKI keys are stored in a PKI server accessible for the gateways.

When a trust list with trusted parties has been created for the first local network, the code means may cause the first gateway to admit a VPN tunnel for establishment between the first local network and a candidate local network if the candidate local network is associated with a first party present in the trust list.

The code means may also cause the first gateway to admit the VPN tunnel for establishment if the candidate local network is indirectly associated with the first party in the trust list by being associated with a second party present in a trust list of the first party.

The code means may also cause the first gateway to admit the VPN tunnel for establishment depending on a predetermined number of trust levels approved for the first local network.

The code means may also cause the first gateway to evaluate the candidate local network for establishment of VPN tunnel in response to a VPN tunnel request from the candidate local network.

The code means may also cause the first gateway to terminate an established VPN tunnel between two local networks automatically if a trust list associated with either network is modified to disqualify the VPN tunnel.

It should be noted that FIG. 4 merely illustrates various exemplary functional units and program modules in the gateway 400 in a logical sense, while the skilled person is free to implement the described functions in practice using any suitable software and hardware means. Thus, the invention is generally not limited to the shown structure of the gateway 400. For example, the computer program product may be a flash memory, ROM (Read-Only Memory) or an EEPROM (Electrically Erasable Programmable ROM), and the computer program modules described above could in alternative embodiments be distributed on different computer program products in the form of memories within the gateway 400.

While the invention has been described with reference to specific exemplary embodiments, the description is generally only intended to illustrate the inventive concept and should not be taken as limiting the scope of the invention. The invention is defined by the appended claims.

The invention claimed is:

1. A method of communicating data packets between a first communications device in a first local network and a second communications device in a second local network, wherein private IP addresses are used for devices in the first and second local networks, comprising:
  establishing a VPN (Virtual Private Network) tunnel between a first gateway serving the first local network and a second gateway serving the second local network, wherein a public IP address has been assigned to each gateway;

defining, in the first gateway, a selected internal IP address space to be used in the first local network for devices in the second local network, the selected internal IP address space being separate from an internal IP address space used in the first local network for devices in the first local network;

receiving, in the first gateway, an incoming data packet from the second device via said VPN tunnel, the incoming packet having an internal IP header including a first internal destination address used in the second local network for the first device and a first internal source address used in the second local network for the second device;

changing the first internal destination address to a second internal destination address used in the first local network for the first device;

changing the first internal source address to a second internal source address that is within the selected internal IP address space and is used in the first local network for the second device; and forwarding the incoming packet to the first device with a modified internal IP header including the changed second internal destination address and the changed second internal source address.

2. A method according to claim 1, wherein the incoming packet further comprises an external IP header including the public IP addresses of said first and second gateways as external destination and source addresses, respectively, wherein the external IP header is removed from the incoming packet by the first gateway.

3. A method according to claim 1, further comprising:

receiving, in the first gateway, an outgoing data packet from the first device, the outgoing packet having an internal IP header including an internal destination address used in the first local network for the second device and an internal source address used in the first local network for the first device;

encapsulating the outgoing data packet with an external IP header including the public IP addresses of said gateways as external destination and source addresses, respectively;

determining a correct VPN tunnel for the outgoing data packet based on the internal destination address in the outgoing data packet; and sending the outgoing data packet to the second gateway via the correct VPN tunnel.

4. A method according to claim 1, wherein VPN tunnels are established between the first local network and a plurality of opposite local networks, and a selected internal IP address space is defined for each opposite local network to be used in the first local network for devices in each respective opposite local network, each selected internal IP address space being separate from any other address space used in the first local network.

5. A method according to claim 4, wherein the selected internal IP address spaces include IPv4-based addresses and a unique number in a second or third octet of each IPv4-based address is allocated to represent the corresponding opposite local network.

6. A method according to claim 5, wherein a VPN tunnel is determined for each outgoing packet based on said unique number in an internal destination address in the outgoing packet, and the outgoing packet is then sent via the determined VPN tunnel.

7. A method according to claim 4, wherein establishing the VPN tunnels includes adding in the gateway of each local network a DNS-registered name and corresponding public PKI key of each opposite gateway.

8. A method according to claim 7, wherein said public PKI key and a corresponding private PKI key are generated for each gateway and the public PKI keys are stored in a PKI server accessible by the gateways.

9. A method according to claim 1, wherein a trust list with trusted parties is created for the first local network, and a VPN tunnel is established between the first local network and a candidate local network if the candidate local network is associated with a first party present in said trust list.

10. A method according to claim 9, wherein the VPN tunnel is established if the candidate local network is indirectly associated with said first party in the trust list by being associated with a second party present in a trust list of the first party.

11. A method according to claim 10, wherein the VPN tunnel is established depending on a predetermined number of trust levels approved for the first local network.

12. A method according to claim 9, wherein the candidate local network is evaluated for establishment of the VPN tunnel in response to a VPN tunnel request from the candidate local network.

13. A method according to claim 9, wherein an established VPN tunnel between two local networks is terminated automatically if a trust list associated with either network is modified to disqualify the established VPN tunnel.

14. An arrangement in a first gateway serving a first local network, configured for communicating data packets between a first communications device in the first local network and a second communications device in a second local network served by a second gateway, the first gateway being configured to establish a VPN tunnel between the first gateway and the second gateway, wherein a public IP address has been assigned to each gateway, and private IP addresses are used for devices in each local network, said arrangement comprising:

an IP address defining module configured to define a selected internal IP address space to be used in the first local network for devices in the second local network, the selected internal IP address space being separate from an internal IP address space used in the first local network for devices in the first local network;

a receiving module configured to receive an incoming data packet from the second device via said VPN tunnel, the incoming packet having an internal IP header including a first internal destination address used in the second local network for the first device and a first internal source address used in the second local network for the second device;

an IP address changing module configured to change the first internal destination address to a second internal destination address used in the first local network for the first device, and to change the first internal source address to a second internal source address that is within the selected internal IP address space and is used in the first local network for the second device; and a forwarding module configured to forward the incoming packet to the second device with a modified internal IP header including the changed second internal destination address and the changed second internal source address.

15. An arrangement according to claim 14, wherein the incoming packet further comprises an external IP header including the public IP addresses of said first and second gateways as external destination and source addresses, respectively, and wherein the IP address changing module is further configured to remove the external IP header from the incoming packet.

16. An arrangement according to claim 14, further configured to:
    receive an outgoing data packet from the first device, the outgoing data packet having an internal IP header including an internal destination address used in the first local network for the second device and an internal source address used in the first local network for the first device;
    encapsulate the outgoing data packet with an external IP header including the public IP addresses of said gateways as external destination and source addresses, respectively;
    determine a correct VPN tunnel for the outgoing data packet based on the internal destination address in the outgoing data packet; and
    send the outgoing packet to the second gateway via the correct VPN tunnel.

17. An arrangement according to claim 14, wherein VPN tunnels are established between the first local network and a plurality of opposite local networks, and a selected internal IP address space is defined for each opposite network to be used in the first local network for devices in each respective opposite network, each selected internal IP address space being separate from any other address space used in the first local network.

18. An arrangement according to claim 17, wherein the selected IP address spaces include IPv4-based addresses and a unique number in a second or third octet of each IPv4-based address is allocated to represent the corresponding opposite local network.

19. An arrangement according to claim 18, wherein the arrangement is further configured to determine a VPN tunnel for each outgoing data packet based on said unique number in an internal destination address in the outgoing packet, and then send the packet via the determined VPN tunnel.

20. An arrangement according to claim 19, wherein the VPN tunnel is established by adding in the gateway of each local network a DNS-registered name and corresponding public PKI key of each opposite gateway.

21. An arrangement according to claim 20, wherein said public PKI key and a corresponding private PKI key are generated for each gateway and the public PKI keys are stored in a PKI server accessible by the gateways.

22. An arrangement according to claim 14, further configured to create a trust list with trusted parties for the first local network, and establish a VPN tunnel between the first local network and a candidate local network if the candidate local network is associated with a first party present in said trust list.

23. An arrangement according to claim 22, further configured to establish the VPN tunnel if the candidate local network is indirectly associated with said first party in the trust list by being associated with a second party present in a trust list of the first party.

24. An arrangement according to claim 23, further configured to establish the VPN tunnel depending on a predetermined number of trust levels approved for the first local network.

25. An arrangement according to claim 22, further configured to evaluate the candidate local network for establishment of a VPN tunnel in response to a VPN tunnel request from the candidate local network.

26. An arrangement according to claim 22, further configured to terminate an established VPN tunnel between two local networks automatically if a trust list associated with either network is modified to disqualify the VPN tunnel.

27. A non-transitory computer-readable medium comprising a computer program configured for a first gateway that serves a first local network and is configured for communicating data packets between a first communications device in the first local network and a second communications device in a second local network served by a second gateway, wherein a VPN tunnel is established between the first gateway and the second gateway, a public IP address has been assigned to each gateway, and private IP addresses are used for devices in each local network, and when executed on the first gateway, causes the first gateway to:
    define a selected internal IP address space to be used in the first local network for devices in the second local network, the selected internal IP address space being separate from an internal IP address space used in the first local network for devices in the first local network; and
    when receiving from the second device via said VPN tunnel an incoming packet having an internal IP header including a first internal destination address used in the second local network for the first device and a first internal source address used in the second local network for the second device:
    change the first internal destination address to a second internal destination address used in the first local network for the first device;
    change the second internal source address to a second internal source address that is within the selected internal IP address space and is used in the first local network for the second device; and
    forward the incoming packet to the first device with a modified internal IP header including the changed second internal destination address and the changed second internal source address.

* * * * *